United States Patent [19]

Hirvi

[11] 4,204,365
[45] May 27, 1980

[54] BOUQUET HOLDER

[75] Inventor: Heikki S. Hirvi, Skarholmen, Sweden

[73] Assignee: Leonard Schoenherr, Ludington, Mich.

[21] Appl. No.: 915,513

[22] Filed: Jun. 14, 1978

[51] Int. Cl.² .............................................. A01G 5/04
[52] U.S. Cl. .................................. 47/41 R; 47/41.12; 403/215
[58] Field of Search .................. 47/41 R, 41.1, 41.11, 47/41.12, 41.13; 428/23; 248/27.8; 206/423; 403/206, 215, 247, 274, 280; 224/45 R, 45 C, 45 P; 294/32

[56] References Cited

U.S. PATENT DOCUMENTS

| | | | |
|---|---|---|---|
| 2,261,326 | 11/1941 | Atkisson et al. | 47/41.13 |
| 2,278,773 | 4/1942 | Erdmann | 47/41.12 |
| 2,563,202 | 8/1951 | Wurzlow | 47/41 |
| 2,637,143 | 5/1953 | Reynolds et al. | 47/41.13 |
| 2,737,746 | 3/1956 | Orr | 47/41.12 |
| 2,891,354 | 6/1959 | Smithers | 47/41.12 |
| 3,651,601 | 3/1972 | La Montagne | 47/41.12 |
| 3,949,568 | 4/1976 | Gallagher | 47/41.12 |

FOREIGN PATENT DOCUMENTS

| | | | |
|---|---|---|---|
| 34576 | 6/1885 | Fed. Rep. of Germany | 47/41.12 |
| 670220 | 4/1952 | United Kingdom | 403/215 |
| 1151128 | 5/1969 | United Kingdom | 47/41.12 |

*Primary Examiner*—Edgar S. Burr
*Assistant Examiner*—Steven A. Bratlie
*Attorney, Agent, or Firm*—Price, Heneveld, Huizenga & Cooper

[57] ABSTRACT

A holder for a bouquet of flowers is disclosed. Particularly the invention is designed for use with bouquets intended to be carried by hand. The holder has a head portion which provides a cage-like structure for holding a block of wettable foam in such a manner that it may be a base for the flowers. A handle, manufactured as a separate component, is secured to the head portion by inserting one end of the handle through the base of the head portion. The handle is made of a material which can be bent and shaped to fit the user's hand and has no spring-back or memory.

1 Claim, 9 Drawing Figures

BOUQUET HOLDER

BACKGROUND OF THE INVENTION

Various devices for organizing, securing and supporting bouquets have long been known and used. These devices include those designed to be hand held such as are used at weddings. These devices have been difficult or awkward to hold and are subject to being accidentally dropped. Many of them are designed with handles. Many have an integral handle which makes them bulky to ship and store. Others equipped with detachable handles have experienced difficulty in securing the handle and also in assuring its positive attachment to the main body of the holder.

BRIEF DESCRIPTION OF THE INVENTION

The invention utilizes a head portion having a shallow, cup-like base which receives and seats a block of foam. The foam is secured in place by an open-mesh, grid-like cap shaped like an inverted cup. The cap is secured to the cup. A detachable handle of a soft, malleable material projects through the bottom of the base and is bent to secure it to the base. The handle may be bent and formed by the user to wrap about the hand, thus providing a positive grip.

DESCRIPTION OF THE PREFERRED EMBODIMENT

The bouquet holder consists of a head portion 10 and a handle 11. The head portion 10 is an assembly fabricated separately from the handle 11.

The head portion has a shallow, cup-like base 12 designed to receive a block of water-retaining foam (not shown). Water-retaining foam material suitable for this purpose is a well-known commercial product extensively used by florists.

Figure 5:
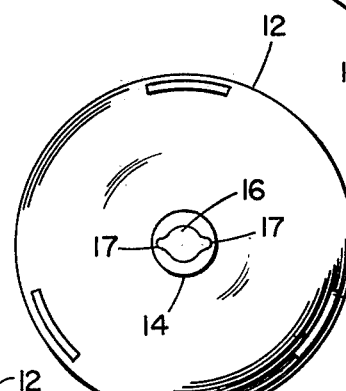
FIG. 5 is a bottom view of the base.
Figure 3:
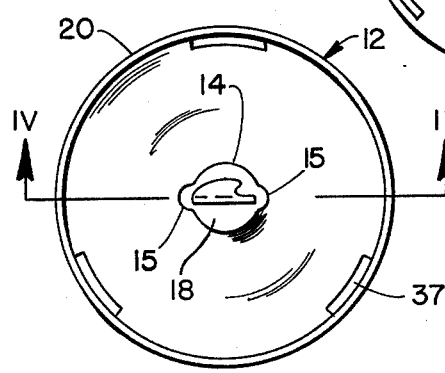
FIG. 3 is a plan view of the base portion of the head of the holder.

The cup-like base 12 has a shallow, concave bottom wall 13 at the center of which is an internal, upstanding boss 14. The boss 14 is generally circular, and above the bottom wall 13, has a pair of diametrically positioned end pillars 15 (FIG. 3). The boss 14 is hollow with the central cavity 16 opening through the bottom of the cup (FIG. 5). The cavity 16 has an enlarged, central opening which communicates with a pair of diametrically opposite slit-like extensions 17. The pillars 15 form a wall reinforcement about the ends of the extensions 17.

The top of the boss 14 is closed or substantially closed by a web 18 (FIG. 3). This web has a slit-like opening 19 (FIG. 2) or a slit-like zone of weakness closed only by a very thin membrane of material. The cup is preferably molded from any suitable material such as polyethylene or styrene that will provide sufficient rigidity to permit the cup to function as a secure support for the bouquet.

Figure 1:
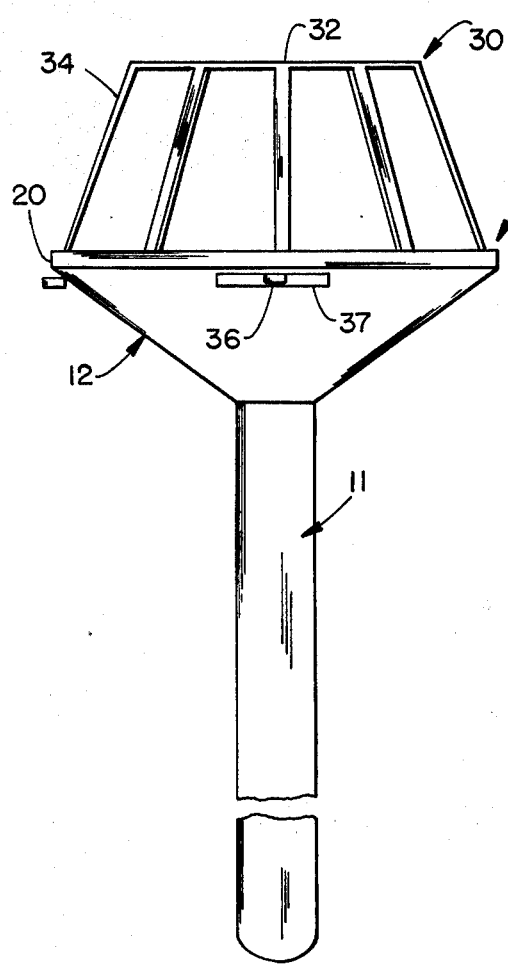
FIG. 1 is a side elevation view showing the invention as initially assembled.

The upper end of the cup 12 terminates in an upstanding rim 20 (FIG. 1).

Figure 2:
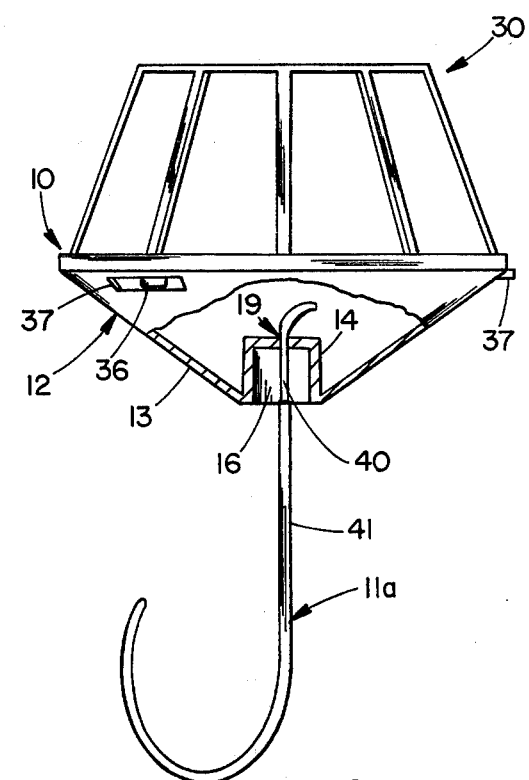
FIG. 2 is a partially broken, end elevation view of the invention showing the handle bent to fit the user's hand.
Figure 4:
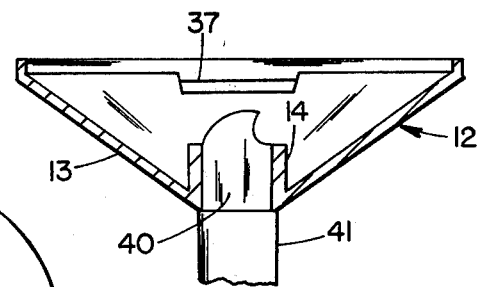
FIG. 4 is a sectional view taken along the plane IV—IV of FIG. 3.
Figure 6:
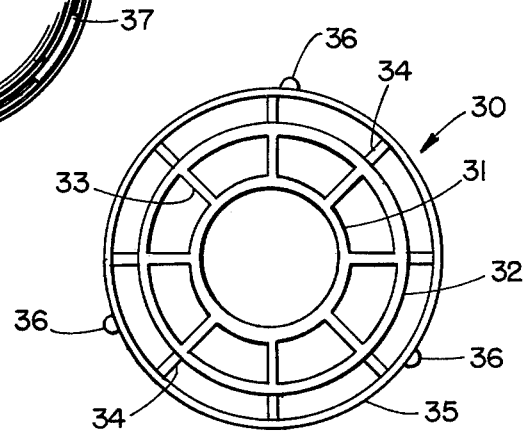
FIG. 6 is a plan view of the cap.

The foam block which is seated in the cup is secured by a cage 30 (FIGS. 1, 2 and 6). The cage 30 has a top consisting of inner and outer concentric rings 31 and 32 joined by spokes 33. The sides of the cage include a plurality of spaced and downwardly inclined legs 34 which join the outer ring 32 to the bottom ring 35. The result of this construction is a frusto-conical shape with the greater part of the sides and top open to permit insertion of flower stems into the foam block inside the cage. The cage, like the cup, can be molded from any suitable plastic material such as polyethylene or styrene.

Three ears 36 project from the bottom ring 35 of the cage. These seat in the slots 37 in the sides of the cup and lock the cage to the cup, thus securing the foam block. The bottom ring 35 seats against the rim 20.

The handle 11 consists of a core 40 of material which is of sufficient strength to support the head when the foam block is saturated with water and the flowers have been attached. At the same time, the material from which the core is made must be soft enough that the user can bend the handle to shape it to fit about the user's hand. Such a shaped handle 11a is illustrated in FIG. 2.

To accomplish this end, the material must have the degree of softness that permits the user to shape it and it must not have any memory which would give it springback. At the same time, when bent, it must not break or crack. Any material having these characteristics can be used as, for example, hot rolled steel or 0.03 soft aluminum.

Because the holder is designed for use in circumstances in which aesthetic considerations are important and, in the case of a metal core, to protect the user against sharp edges or discoloration, all but the upper end of the handle is coated with a protective finish, such as a thin polyvinyl sheath 41. This can be done by conventional methods such as dip molding or powder deposition.

The upper end of the core 40 of the handle 11 is shaped into a point which is inserted through the slit-like opening 19 in the boss 14. The pointed shape helps to guide the handle through the boss and, if the slit is closed by a thin membrane, it serves to pierce the membrane. The width of the handle core 40 is such that it fits snugly into the extension 17 of the cavity 16. Further, whether or not it ruptures a membrane initially closing the opening 19 in the top of the boss, the core snugly fits this opening. This type of fit is necessary to prevent the head portion 10 from wobbling or being otherwise unstable on the end of the handle. Any instability at this point would be entirely unacceptable.

It will be seen from FIGS. 2 and 3 that the sheath is terminated short of the pointed end of the handle. In fact, the end of the sheath acts as a stop to limit the extent to which the handle can be inserted into the boss.

The handle is inserted deep enough that about a half inch of it projects above the top of the boss 14. This projecting end is then twisted about its longitudinal axis to securely affix the handle to the cup so it cannot be withdrawn. It will be recognized that the end could be bent over, but this technique does not produce as satisfactory a result as twisting. After the handle has been attached as described above, the foam block is inserted and the cage 30 installed. The foam block will not be saturated with water until the holder is to be used.

Figure 7:
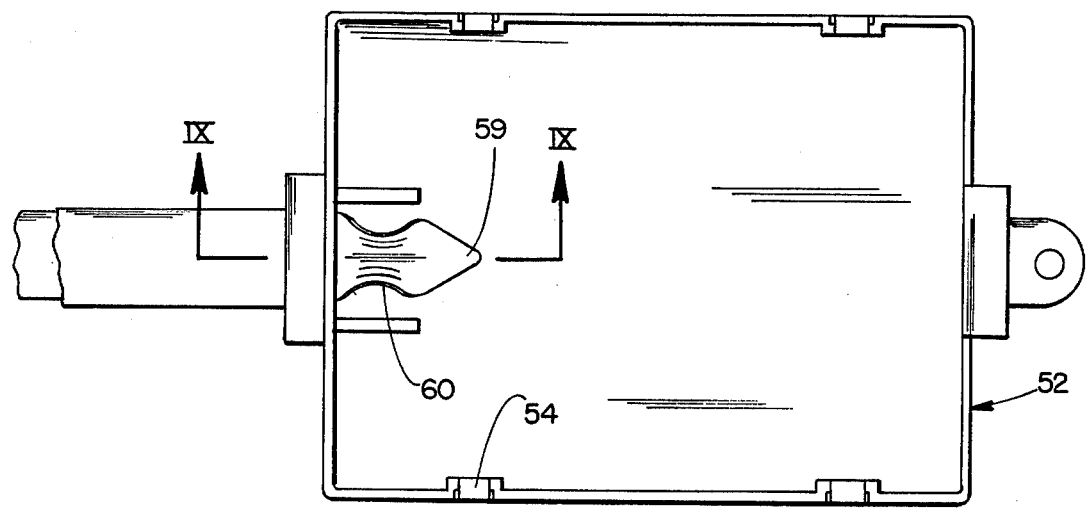
FIG. 7 is a fragmentary, plan view of the base of a modified bouquet holder.
Figure 8:
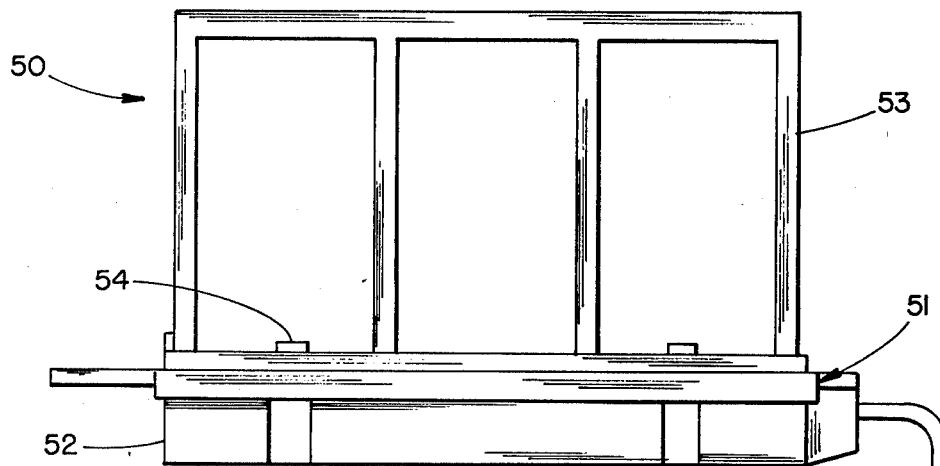
FIG. 8 is a side elevation view of the bouquet holder of FIG. 7, mounted for use.
Figure 9:
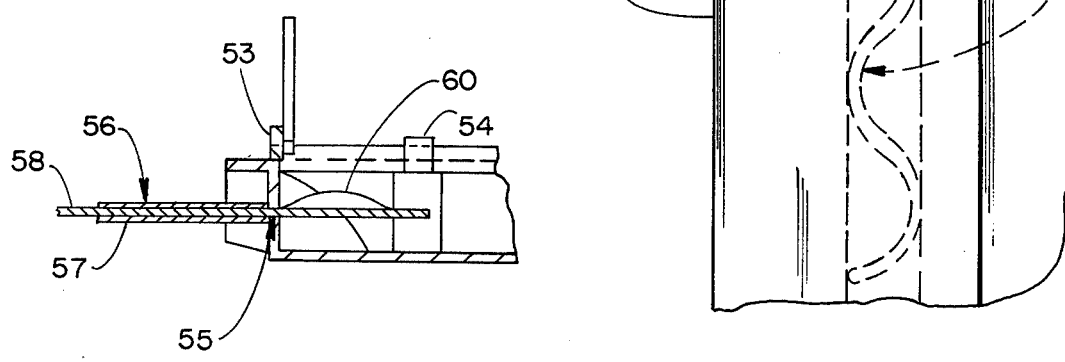
FIG. 9 is an enlarged, fragmentary, sectional view taken along the plane IX—IX of FIG. 7.

FIGS. 7, 8 and 9 illustrate the versatility of the invention in its application to a bouquet holder 50 for decorative purposes such as on the pews along the aisle of a church. In this case, the head portion 51 of the holder 50 is rectangular, having a shallow base portion 52 and a foam-enclosing cage 53 which seats over and is anchored to the base by snap catches 54. As in the case of the holder illustrated in FIGS. 1-6, a block of water-retaining foam is placed within the cage 53.

At one end, the base portion has a rectangular slot 55 through which one end of a handle or support 56 is mounted. The handle 56 is identical to the handle 11 including the plastic coating 57 which terminates short of one end. It also has a core 58 of the same material as the core 40. The handle 56 also has a pointed end 59 to facilitate its insertion through the slot 55. Where the handle passes through the wall of the base, it has a tight fit and may even have to break a thin web of plastic. The end portion of the handle within the base 52 is crimped or bent at 60 as illustrated in FIGS. 7 and 9 to lock it in place. Between the tight fit in the opening 55 and the crimping, the handle is securely and rigidly attached to the base 52.

FIG. 8 illustrates one use of this particular bouquet holder. In this case, the handle 56 is bent at a right angle and the free end is inserted in a suitable opening 61 in the top of the end standard of a pew 62. This arrangement provides an inexpensive and effective way of attaching flowers to the pews when the occasion arises. It overcomes the problems which so frequently occur when this is done because the handle provides a positive, dependable attachment and can be bent to any suitable configuration at the time of placement to locate the bouquet in the most advantageous position. Further, as suggested in FIG. 8, the handle can be bent in an undulating shape so it has positive engagement with opposite walls of the opening to stabilize the bouquet.

It will be recognized that the invention provides a bouquet holder which can be shaped to fit the user's hand and thus provide a firm and secure grip. This is important to prevent inadvertent dropping of the bouquet. The invention also has the advantage that the handle and the head portion can be manufactured by different sources and shipped and stored separately. This results in significant economy of shipping and storage space until assembled, an increasingly important factor. When there is a demand for the bouquet holder, the head, handle and foam block are assembled and delivered to the customer. The foam, however, will not be wetted until the holder is to be used.

While both a preferred embodiment and a modification of this invention have been described, and a few other modifications have been suggested, it will be recognized that additional modifications can be made without departing from the principles of the invention. Such modifications are to be considered as included in the hereinafter appended claims unless these claims, by their language, expressly state otherwise.

The embodiments of the invention in which an exclusive property or privilege is claimed are defined as follows:

1. A holder for a bouquet of flowers, said holder having a cup-shaped head for receiving a shaped block of moisture-retaining foam and a handle, said holder characterized in that said head has a boss extending into said head, said boss having walls defining an axially elongated, slit-like channel extending therethrough; said handle being an elongated member of ribbon-like cross section and of a material capable of withstanding being gripped in the hand without crushing and be readily bendable and having no memory whereby, when bent to a particular shape, it will retain that shape without spring-back; one end of said handle extending through said boss in tight frictional engagement with the walls of said channel throughout the length of said channel to provide a rigid connection between the handle and head; said one end of said handle projecting into said head beyond the end of said boss and being twisted about its greater axis to lock said handle positively against detachment from said head.

* * * * *